(12) United States Patent
Little et al.

(10) Patent No.: US 7,792,403 B1
(45) Date of Patent: Sep. 7, 2010

(54) ADIABATIC POLARIZATION CONVERTER

(75) Inventors: Brent E. Little, Columbia, MD (US); John Hryniewicz, Columbia, MD (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 11/222,358

(22) Filed: Sep. 8, 2005

(51) Int. Cl.
*G02B 6/00* (2006.01)
*G02B 6/26* (2006.01)

(52) U.S. Cl. .............. 385/43; 385/11; 385/27

(58) Field of Classification Search .......... 385/43, 385/47, 11, 27
See application file for complete search history.

(56) References Cited

U.S. PATENT DOCUMENTS

| | | | |
|---|---|---|---|
| 3,955,202 A * | 5/1976 | Young | 343/756 |
| 4,142,775 A | 3/1979 | Ramaswamy et al. | |
| 4,153,328 A | 5/1979 | Wang | |
| 4,220,395 A | 9/1980 | Wang et al. | |
| 4,691,984 A | 9/1987 | Thaniyavarn | |
| 4,781,424 A * | 11/1988 | Kawachi et al. | 385/132 |
| 4,966,431 A | 10/1990 | Heismann | |
| 5,078,512 A * | 1/1992 | Ando | 385/11 |
| 5,140,654 A | 8/1992 | Akasaka et al. | |
| 5,185,828 A | 2/1993 | van der Tol | |
| 5,218,653 A | 6/1993 | Johnson et al. | |
| 5,243,669 A | 9/1993 | Alferness et al. | |
| 5,263,102 A | 11/1993 | Hakogi | |
| 5,351,317 A | 9/1994 | Weber | |
| 5,361,320 A * | 11/1994 | Liu et al. | 385/143 |
| 5,392,142 A | 2/1995 | Mitsutake et al. | |
| 5,396,365 A | 3/1995 | Gustavsson | |
| 5,446,807 A | 8/1995 | Baran et al. | |
| 5,535,001 A | 7/1996 | Tajima | |
| 5,539,845 A * | 7/1996 | van der Tol | 385/11 |
| 5,638,473 A | 6/1997 | Byron | |
| 5,661,825 A | 8/1997 | Van Dam et al. | |
| 5,708,734 A | 1/1998 | Van Der Tol | |
| 5,832,825 A | 11/1998 | Bruno | |

(Continued)

FOREIGN PATENT DOCUMENTS

WO WO 9307653 A1 * 4/1993

OTHER PUBLICATIONS

Y. Onoue et al., Elimination of Polarization Sensitivity in Silica-Based Wavelength Division Multiplexer Using a Polyimide Half Waveplate, Journal of Lightwave Technology, 15:10:1947-1957, Oct. 1997.

(Continued)

*Primary Examiner*—K. Cyrus Kianni
(74) *Attorney, Agent, or Firm*—Dunlap, Codding & Rogers, P.C.; Ross M. Carothers (57) ABSTRACT

The present invention relates to a waveguide structure, and methods for making the same. The waveguide structure has a polarization rotator for rotating the polarization of the electromagnetic signal, preferably by about ninety-degrees. In one embodiment, the polarization rotator has a midsection with a first level and a second level. The first level of the midsection has a width that decreases along the length of the first level, while the second level has a substantially constant width along the length of the second level. Further, the waveguide structure can include an input conditioning section and the output conditioning section to facilitate matching between the polarization rotator and other waveguide elements.

16 Claims, 9 Drawing Sheets

U.S. PATENT DOCUMENTS

| | | | |
|---|---|---|---|
| 6,011,641 | A | 1/2000 | Shin et al. |
| 6,104,850 | A | 8/2000 | Dong |
| 6,278,813 | B1 * | 8/2001 | Takada et al. ............... 385/24 |
| 6,404,946 | B1 | 6/2002 | Nakajima et al. |
| 6,477,287 | B1 * | 11/2002 | Hait ............................ 385/15 |
| 6,498,878 | B1 | 12/2002 | Ueda |
| 6,546,161 | B2 * | 4/2003 | Okuno et al. ................. 385/14 |
| 6,600,582 | B1 * | 7/2003 | Liu et al. ...................... 398/79 |
| 6,625,364 | B2 * | 9/2003 | Johnson et al. ............. 385/127 |
| 6,697,553 | B2 | 2/2004 | Bhardwaj et al. |
| 6,720,840 | B2 | 4/2004 | Bohnet |
| 6,721,467 | B2 | 4/2004 | Olson |
| 6,853,758 | B2 | 2/2005 | Ridgway et al. |
| 6,907,169 | B2 * | 6/2005 | Vahala et al. ................. 385/50 |
| 7,006,234 | B1 | 2/2006 | Cottrell et al. |
| 7,016,571 | B2 | 3/2006 | Joyner et al. |
| 7,068,864 | B2 * | 6/2006 | Hanashima et al. ............ 385/6 |
| 7,127,183 | B2 | 10/2006 | Oguma |
| 7,164,822 | B2 | 1/2007 | Arakawa |
| 7,221,826 | B2 * | 5/2007 | Hanashima et al. ........... 385/43 |
| 7,228,015 | B2 * | 6/2007 | Watts et al. ................... 385/11 |
| 7,236,668 | B2 * | 6/2007 | Hanashima et al. ........... 385/43 |
| 7,245,793 | B2 * | 7/2007 | Kamei et al. ................. 385/14 |
| 2001/0009595 | A1 * | 7/2001 | Okuno et al. ................. 385/14 |
| 2001/0046363 | A1 * | 11/2001 | Purchase et al. ............. 385/140 |
| 2002/0154844 | A1 * | 10/2002 | Shekel et al. .................... 385/8 |
| 2002/0181870 | A1 | 12/2002 | Inoue et al. |
| 2003/0012501 | A1 * | 1/2003 | Nakajima et al. ............. 385/37 |
| 2003/0072512 | A1 | 4/2003 | Nagaeda et al. |
| 2003/0081903 | A1 * | 5/2003 | Vahala et al. ................. 385/50 |
| 2003/0099428 | A1 * | 5/2003 | LoCascio et al. ............. 385/16 |
| 2004/0126052 | A1 * | 7/2004 | Kamei et al. ................. 385/14 |
| 2005/0095741 | A1 | 5/2005 | Johnstone et al. |
| 2005/0254128 | A1 * | 11/2005 | Watts .......................... 359/558 |
| 2005/0265403 | A1 * | 12/2005 | Anderson et al. ............. 372/20 |
| 2005/0271325 | A1 * | 12/2005 | Anderson et al. ............. 385/40 |
| 2006/0018584 | A1 * | 1/2006 | Watts et al. ................... 385/11 |
| 2006/0197629 | A1 | 9/2006 | Pivit et al. |
| 2008/0147759 | A1 * | 6/2008 | Fiorentino et al. .......... 708/250 |

OTHER PUBLICATIONS

T. Lang et al., New Passive Polarization converter on Glass Substrate. IEEE Photonics Technology Letters, 10:9:1295-1297, Sep. 1998.

M. Watts et al., Integrated Mode-Evolution-Based Polarization Rotators. Optics Letters, 30:2:138-140, Jan. 2005.

* cited by examiner

ADIABATIC POLARIZATION CONVERTER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

In general, a waveguide is a device, or a system of material boundaries, that is designed to confine and direct the propagation of electromagnetic waves, such as light or optical signals, along a length of the waveguide.

An electromagnetic wave is a vector field that has two primary and orthogonal polarization states or vector directions associated with its propagation. These polarization states are generally referred to as the Transverse Electric (TE) mode and Transverse Magnetic (TM) mode for optical waveguides. In the TM mode, the magnetic lines of flux are predominantly oriented parallel to the substrate on which the waveguide sits, while in the TE mode the electric lines of flux are predominantly oriented parallel to the substrate.

The performance of waveguides and other optical devices is often sensitive to the polarization state of the electromagnetic wave propagation. That is, certain optical devices require or prefer an inputted signal to have a certain polarization state for optimal operation. Therefore, it is sometimes necessary to convert or rotate the polarization state of a signal before it is inputted to a certain optical device.

While various devices exist for converting or rotating the polarization of optical signals, to Applicant's knowledge, these systems require additional and specialized materials, such for example magneto optic, gyrotropic, electrooptic, anisotropic or birefringent materials, which results in extra components and/or costs. Some devices also require externally applied electric fields or post-fabrication calibration. Further, some devices are wavelength dependent, introduce scattering loss, or are highly fabrication sensitive, thus limiting the scope of their application. Therefore, there is a need for an effective and efficient waveguide structure for rotating the polarization of an electromagnetic signal, which overcomes the above mentioned problems and limitations of prior art devices, and which is compatible and integratable with other optical circuit elements. It is to such a device, and methods for making and using the same, that the present invention is directed.

BRIEF DESCRIPTION OF THE SEVERAL VIEWS OF THE DRAWINGS

FIGS. 5A-5F cooperate to show one method for making a waveguide structure in accordance with the present invention using an etching technique. More particularly:

FIGS. 6A-6D cooperate to show another method for making a waveguide structure in accordance with the present invention using a layering technique. More particularly:

DETAILED DESCRIPTION

In general, the present invention relates to an apparatus and method for rotating a state of polarization of an electromagnetic wave or signal, preferably through ninety degrees. More particularly, the present invention relates to a polarization rotator that rotates the polarization of an electromagnetic signal as the electromagnetic signal propagates through the polarization rotator. A preferable use of the present invention is in integrated optics, where it is often desirable to rotate the polarization of a signal by about ninety degrees, or equivalently to convert a substantially Transverse Electric (TE) polarized signal into a substantially Transverse Magnetic (TM) polarized signal, or a substantially TM polarized signal into a substantially TE polarized signal.

Figure 1:
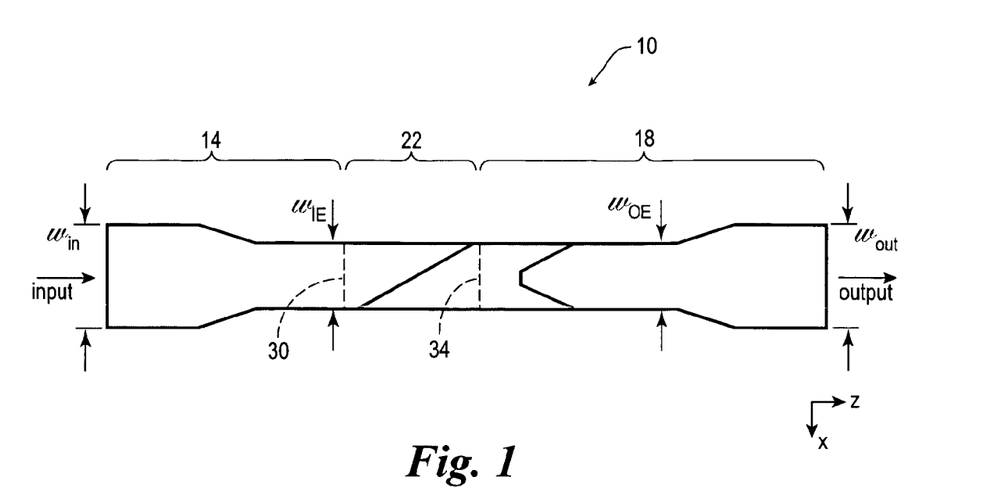
FIG. 1 is a top view of one embodiment of a waveguide structure forming a polarization rotator constructed in accordance with the present invention.

Referring now to the drawings, and in particular to FIG. 1, shown therein and labeled by the general reference numeral 10 is one embodiment of a waveguide structure constructed in accordance with the present invention. The waveguide structure 10 includes an input conditioning section 14, an output conditioning section 18, and a polarization rotator 22 disposed between the input conditioning section 14 and the output conditioning section 18. In general, an electromagnetic signal is incident upon or enters the waveguide structure 10 via the input conditioning section 14, and propagates from the input conditioning section 14 through the polarization rotator 22 to the output conditioning section 18, where the electromagnetic signal exits the waveguide structure 10. As the electromagnetic signal propagates through the polarization rotator 22, the state of polarization of the electromagnetic signal is rotated. Preferably, the polarization rotator 22 is constructed so as to rotate the polarization of the electromagnetic signal by about ninety-degrees.

While the waveguide structure 10 is generally described herein in terms of the electromagnetic signal entering via the input conditioning section 14 and exiting via the output conditioning section 18 for purposes of clarity of discussion, it should be understood that the present invention also contemplates that alternatively, an electromagnetic signal can enter the waveguide structure 10 via the output conditioning section 18 and exit via the input conditioning section 14 for a reverse polarization rotation effect.

In general, the polarization rotation of the electromagnetic signal by the polarization rotator 22 is achieved in accordance with the present invention by a geometry of the polarization rotator 22. The geometry of the polarization rotator 22 is provided such that it introduces a gradually varying "twist" or rotation in the birefringent properties of the polarization rotator 22 along a length of the polarization rotator 22. In other words, the geometry of the polarization rotator 22 effectively rotates a birefringent axes of the polarization rotator 22 as a function of propagation distance.

As the electromagnetic signal propagates through the polarization rotator 22, the polarizations of the electromagnetic signal tend to line up with the birefringent axes of the polarization rotator 22. If the twist is slow enough through the polarization rotator 22, the polarization states of the electromagnetic signal will generally follow and rotate along with the birefringent axes of the polarization rotator 22, thereby inducing rotation of the polarization of the electromagnetic signal as the electromagnetic signal propagates through the polarization rotator 22. The effective rotation of the polarization is preferably about ninety degrees, which is equivalent to the energy in an initially TM mode transforming into a TE mode, and energy in an initially TE mode transforming into a TM mode. In other words, the polarization rotator 22 is capable of polarization "conversion".

Preferably, the geometry of the polarization rotator 22 is also provided such that there is minimal or no scattering or diffraction loss, and there is minimal or no power exchange or coupling between the two principle polarization states of the electromagnetic signal at any point in the polarization rotator 22. This criterion is known as the adiabatic condition. The adiabatic rotation of the polarization rotator 22 of the present invention is preferable to a coupled mode type rotation, such as that which occurs in half-wave plates, because the adiabatic mechanism of the polarization rotator 22 is generally wavelength independent and fabrication insensitive. Further, the adiabatic rotation of the polarization rotator 22 can be utilized to rotate all input states of polarization, whereas a half-wave plate only fully rotates states that are aligned at a forty-five degree angle to the birefringent axis of the plate.

Figure 2:
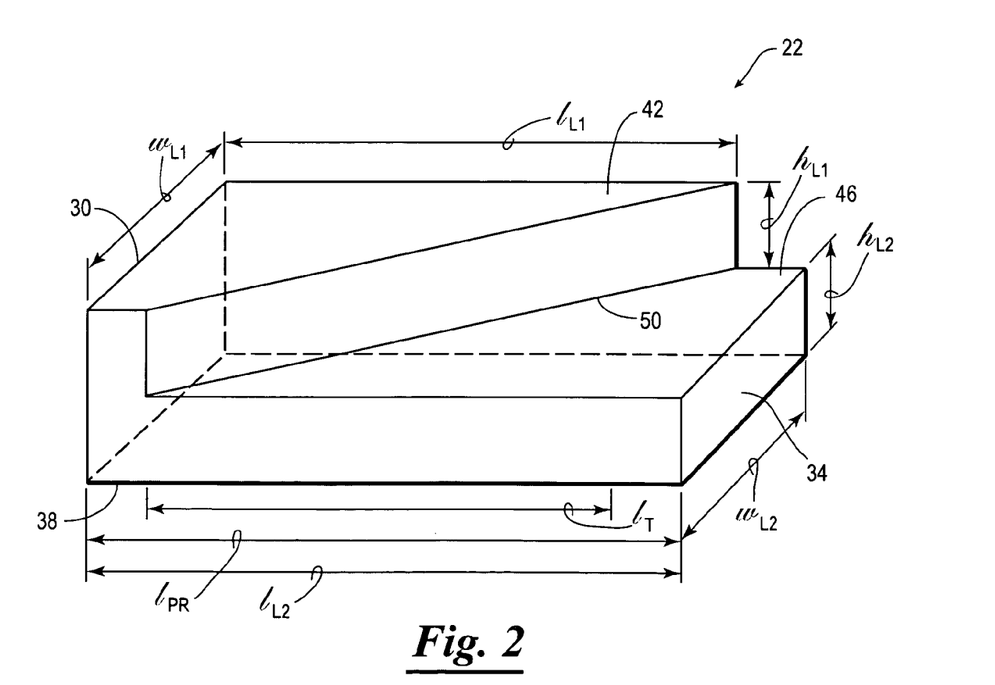
FIG. 2 is perspective view of one embodiment of the polarization rotator depicted in the waveguide structure of FIG. 1.

The polarization rotator 22 of the waveguide structure 10 is shown independently and in more detail in FIGS. 2 and 3A-3D. As best shown in FIG. 2, the polarization rotator 22 has an input end 30, an output end 34, and a midsection 38 having a overall length $l_{PR}$ which extends generally between the input end 30 and the output end 34. When an electromagnetic signal propagates through the polarization rotator 22, the electromagnetic signal generally travels along the overall length $l_{PR}$ of the midsection 38 from the input end 30 to the output end 34.

In one embodiment, to provide the polarization rotator 22 with a geometry that induces rotation of the electromagnetic signal as the electromagnetic signal propagates through the polarization rotator 22, the midsection 38 of the polarization rotator 22 includes a first level 42 and a second level 46, as best shown in FIG. 2. As such, the polarization rotator 22 is referred to herein as being "bi-level". Preferably, the first level 42 and the second level 46 are constructed so as to be integrated and function as a unified whole of the midsection 38. However, the first level 42 and the second level 46 are generally described herein in terms of discrete elements.

The first level 42 of the midsection 38 has a length $l_{L1}$, a width $w_{L1}$, and a height $h_{L1}$; and the second level 46 of the midsection 38 has a length $l_{L2}$, a width $w_{L2}$, and a height $h_{L2}$. The first level 42 is disposed adjacent the second level 46 such that generally the lengths $l_{L1}$ and $l_{L2}$ are aligned, the widths $w_{L1}$ and $w_{L2}$ are aligned, and the heights $h_{L1}$ and $h_{L2}$ are aligned.

Figure 3A:
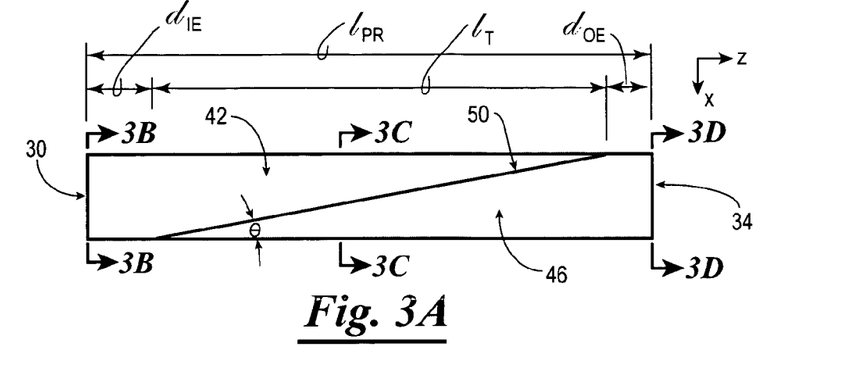
FIG. 3A is a top view of the polarization rotator depicted in FIG. 2.

The first level 42 of the midsection 38 is constructed such that the width $w_{L1}$ of the first level 42 decreases along the length $l_{L1}$ of the first level 42, while the second level 46 of the midsection 38 is constructed such that the width $w_{L2}$ of the second level 46 is substantially constant along the length $l_{L2}$ of the second level 46. Preferably, the decrease in the width $w_{L1}$ of the first level 42 starts at a distance $d_{IE}$ from the input end 30 of the polarization rotator 22, as shown best in FIG. 3. Also, the width $w_{L1}$ of the first level 42 preferably decreases to a width equal to zero at a distance $d_{OE}$ from the output end 34 of the polarization rotator 22. As such, a lateral distance between the point of initial decrease of the width $w_{L1}$ of the first level 42 to the point where the width $w_{L1}$ is zero, which is referred to herein as a taper length $l_T$, is less than the length $l_{PR}$ of the midsection 38.

As shown best in FIG. 3, a line 50 demarcates the boundary between the first level 42 and the second level 46. It can be seen that the slope of the line 50 generally defines the relationship between at least a portion of the length $l_{L1}$ of the first level 42 (which essentially corresponds to the taper length $l_T$) and the width $w_{L1}$ of the first level 42. In one embodiment, the first level 42 is constructed such that the width $w_{L1}$ of the first level 42 decreases gradually and continuously, thereby providing the line 50 with a slope that is substantially constant. As such, the line 50 slopes in a monotonic linear or straight fashion and provides the first level 42 with a substantially wedge shape, as shown for example in FIGS. 2 and 3. Also, because the slope is constant, it can be seen that the slope can equivalently be defined by a taper angle $\theta$.

Although the slope and shape of the line 50 demarcating the boundary between the first level 42 and the second level 46 of the midsection 38 is described in one embodiment as being substantially constant, the slope and shape of the line 50 (and thus the rate of change of the width $w_{L1}$ of the first level 42 with respect to at least a portion of the length $l_{L1}$) can be varied. More optimum shapes may be used in order to achieve a minimum length for a certain amount of insertion loss or other criteria. For example, in the embodiment of the polarization rotator 22 depicted in FIG. 1, polarization rotation tends to occur more towards the center of the polarization rotator 22. Because, little rotation occurs near the input end 30 and the output end 34 of the polarization rotator 22, the slope in the portions near the input end 30 and the output end 34 can be more abrupt than near the center of the polarization rotator 22 without substantially changing the adiabatic quality of the polarization rotator 22.

Figure 4:
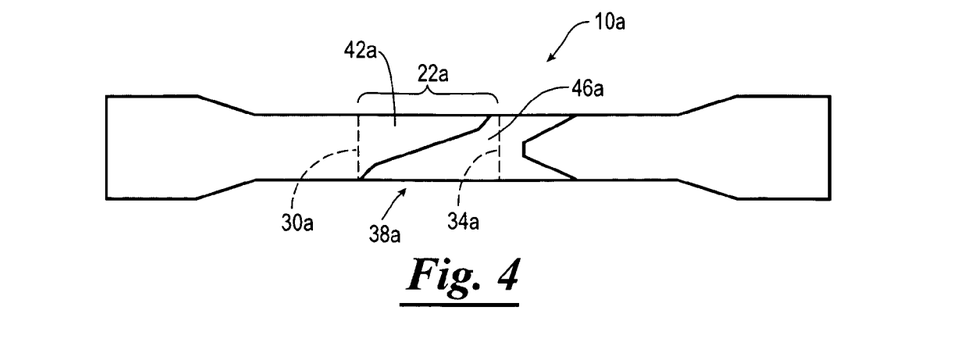
FIG. 4 is a top view of another embodiment of a waveguide structure forming a polarization rotator constructed in accordance with the present invention.

For example, shown in FIG. 4 and labeled by the reference numeral 10a is another embodiment of a waveguide structure constructed in accordance with the present invention. The waveguide structure 10a shown in FIG. 4 has a polarization rotator 22a that is similar to the polarization rotator 22 of the waveguide structure 10 shown in FIG. 1 in that the polarization rotator 22a of the waveguide structure 10a has an input end 30a (shown in phantom), an output end 34a (shown in phantom), and a midsection 38a having a first level 42a and second level 46a. However, for the polarization rotator 22a shown in FIG. 4, portions of the first level 42a of the midsection 38a have a slope that tapers in differing amounts or at different rates near the input end 30a and the output end 42a of the polarization rotator 22.

Also, while the width $w_{L1}$ of the first level 42 of the polarization rotator 22 is described above in one embodiment as decreasing gradually and continuously, it should be understood that the width $w_{L1}$ can be decreased periodically to form a step-like boundary, or in any other suitable manner of gradual and/or abrupt discontinuites so long as the overall geometry of the midsection 38 induces rotation of the polarization of the electromagnetic signal. However, the rate of change of the width $w_{L1}$ of the first level 42 of the polarization rotator 22 is preferably gradual so that the rate of change is adiabatic, i.e., so that generally no loss or mode coupling results.

Figure 3B:
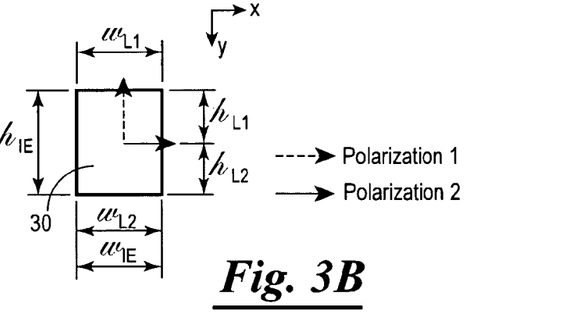
FIG. 3B is a cross sectional view of the polarization rotator depicted in FIG. 3A taken along the line 3B-3B of FIG. 3A.
Figure 3C:
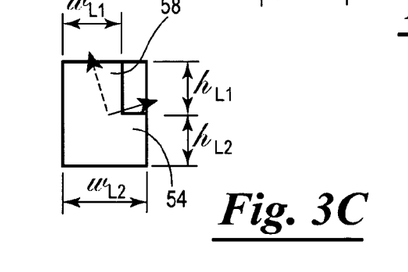
FIG. 3C is a cross sectional view of the polarization rotator depicted in FIG. 3A taken along the line 3C-3C of FIG. 3A.
Figure 3D:
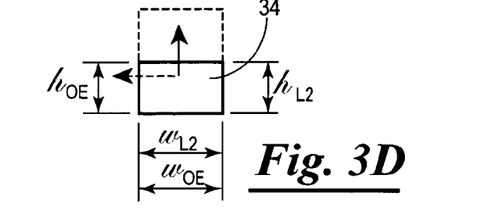
FIG. 3D is a cross sectional view of the polarization rotator depicted in FIG. 3A taken along the line 3D-3D of FIG. 3A.

Referring again to the waveguide structure 10 shown in FIG. 1, the geometry of the polarization rotator 22 resulting from the decrease in the width $w_{L1}$ of the first level 42 of the midsection 38 along the length $l_{L1}$ of the first level 42 is further illustrated best by the cross sectional views of FIGS. 3B-3D, which are taken at various points between the input end 30 and the output end 34 of the polarization rotator 22. It can be seen in FIG. 3B that the cross section taken near the input end 30 has a generally rectangular shape resulting from the collective widths $w_{L1}$ and $w_{L2}$ and the heights $h_{L1}$ and $h_{L1}$ of the first level 42 and the second level 46, respectively. In other words, the first level 42 and the second level 46 of the midsection 38 cooperate to form the input end 30 of the polarization rotator 22. As such, the input end 30 of the polarization rotator 22 has an overall width $w_{IE}$ and an overall height $h_{IE}$ that corresponds to the collective widths $w_{L1}$ and $w_{L2}$ and the heights $h_{L1}$ and $h_{L2}$ of the first level 42 and second level 46, respectively.

In FIG. 3C, it can be seen that at a point taken around the middle of the midsection 38, the cross section has a generally "L" shape. The "L" shape has a horizontal or "arm" portion 54, which results from the width $w_{L2}$ and the height $h_{L2}$ of the second level 46 of the midsection 38, and a vertical or "panhandle" portion 58, which results from the width $w_{L1}$ and height $h_{L1}$ of the first level 46 of the midsection 38. As discussed above, the width $w_{L2}$ of the second level 46 preferably does not change along the length $l_{L2}$ of the second level 46, and thus the arm portion 54 remains substantially constant in the cross section view along the length $l_{L2}$. However, the width $w_{L1}$ of the first level 42 decreases along the length $l_{L1}$ of the first level 42, and thus the panhandle portion 58 decreases along the length $l_{L1}$ until at some point the panhandle portion is no longer present in the cross section view (preferably at a point near the output end 34) as shown in the cross section of FIG. 3D.

In other words, the width $w_{L1}$ of the first level 42 is preferably decreased such that only the second level 46 of the midsection 38 substantially forms the output end 34 of the polarization rotator 22. As such, the output end 34 of the polarization rotator 22 has an overall width $w_{OE}$ and an overall height $h_{OE}$ that corresponds to the width $w_{L2}$ and the height $h_{L2}$ of the second level 46. Therefore, it can be seen that the height $h_{OE}$ of the output end 34 will generally be less than the height $h_{IE}$ of the input end 30. Also, while the width $w_{OE}$ at the output end 34 of the polarization rotator 22 is preferably the same as the width $w_{IE}$ at the input end 30, it should be understood that the width $w_{OE}$ at the output end 34 of the polarization rotator 22 may also be different than the width $w_{IE}$ at the input end 30.

At the input end 30, the polarization rotator 22 is capable of supporting at least two modes: the TM mode, the TE mode, and combinations thereof. The TM mode is generally described herein as being polarized along the vertical direction (or the y-direction shown in the cross section of FIG. 3B). The TE mode is generally described herein as being polarized along the horizontal direction (or the x-direction shown in the cross section FIG. 3B). Preferably, the width $w_{IE}$ of the input end 30 of the polarization rotator 22 is small enough in relation to the height $h_{IE}$ of the input end 30 such that the mode with the largest effective index is the TM mode. In other words, the height $h_{IE}$ is preferably greater than the width $w_{IE}$ at the input end 30. As such, the input end 30 of the polarization rotator 22 is described and shown herein in one embodiment as having a cross section with a vertically oriented rectangular shape. However, it should be understood that the polarization rotator 22 can be constructed such that the input end 30 is provided with another shape in accordance with the present invention, such as for example an oval or trapezoidal shape.

Similar to the input end 30, the output end 34 of the polarization rotator 22 also supports the TM mode, the TE mode, and combinations thereof. However, the height $h_{OE}$ of the output end 34 of the polarization rotator 22 is preferably made small enough in relation to the width $w_{OE}$ of the output end 34 such that the mode with the largest effective index is the TE mode. In other words, the height $h_{OE}$ is preferably less than the width $w_{OE}$ at the output end 34 of the polarization rotator 22. As such, the output end 34 is described and shown herein in one embodiment as having a cross section with a horizontally oriented rectangular shape. However, it should be understood that the polarization rotator 22 can be constructed such that the output end 34 is provided with another shape in accordance with the present invention, such as for example an oval or trapezoidal shape.

This changing geometry of the midsection 38 effectively rotates a birefringent axes of the polarization rotator 22 as a function of propagation distance by about ninety degrees, and thus effectively rotates the polarization states of the electromagnetic signal as it travels from the input end 30 to the output end 34 of the polarization rotator 22. The direction of the principle polarization directions of the electromagnetic signal will depend on the geometry of the polarization rotator 22, and more particularly on the width $w_{L1}$ of the panhandle portion 58. If the width $w_{L1}$ of the panhandle is nearly as wide as the width $w_{L2}$ of the arm portion 54 of the "L" shape, such as near the input end 30, the mode with the highest effective index is TM polarized (or vertically polarized). If the width $w_{L1}$ of the panhandle portion 58 is very narrow with respect to the width $w_{L2}$ of the arm portion 54, such as near the output end 34, the mode with the highest effective index is TE polarized (or horizontally polarized). When the width $w_{L1}$ of the panhandle portion 58 varies gradually, the principle directions of polarization will rotate therewith. As such, the principle polarization directions of the electromagnetic signal in the "L" shape portion of the midsection 38 will generally not line up with the vertical or horizontal directions of the polarization rotator 22, as shown best in the cross section of FIG. 3C. In other words, the principle modes in the "L" shape portion of the midsection 38 will generally not be purely TE or TM polarized.

Referring again to FIG. 1, as discussed above the waveguide structure 10 includes the input conditioning section 14 and the output conditioning section 18. The input conditioning section 14 is disposed adjacent the input end 30 of the polarization rotator 22, and the output conditioning section 18 is disposed adjacent the output end 34 of the polarization rotator 22. In general, the input conditioning section 14 and the output conditioning section 18 facilitate matching between the polarization rotator 22 to other waveguide elements (not shown) so that the polarization rotator 22 is a readily integratable optic structure that can be used within an integrated optical circuit having other waveguide elements. Since other waveguide elements in an optical circuit will often have different types of geometric requirements on their widths and heights, the input conditioning section 14 and the output conditioning section 18 set up favorable input and output requirements for the polarization rotator 22 in relation to other connecting waveguide elements (although they do not contribute to polarization rotation), and as such are referred to as "conditioning" sections.

More particularly, the input conditioning section 14 is a waveguide that transforms some width $w_{in}$ (e.g., that corresponds to a width of a connecting waveguide element such as a fiber optic or fiber optic connector) into a desirable width corresponding to the width $w_{IE}$ of the input end 30 of the polarization rotator 22. Preferably, the transition between the width $w_{in}$ and width $w_{IE}$ is caused through a simple lateral waveguide taper.

The output conditioning section 18 transforms a width corresponding to the width $w_{OE}$ of the output end 34 of the polarization rotator 22 to some desired width $w_{out}$. Further, the output conditioning section 18 restores a height corresponding to the height $h_{OE}$ of the output end 34 of the polarization rotator 22 to a desire height $h_{out}$ (e.g., that corresponds to the original height $h_{IE}$ of the input end), without disturbing the polarization states or causing the states to rotate. Preferably, the transition between the width $w_{OE}$ and the width $w_{out}$ is caused through a simple lateral waveguide taper. The transition between the height $h_{OE}$ and the height $h_{out}$ is preferably caused by a bi-level waveguide pattern that is symmetric, i.e., that is shaped so as to have a mirror symmetry along the center of the output conditioning section 18. For example, as shown in FIG. 1, the output conditioning section 18 can be provided with a wedge shaped pattern that is centered in the middle of the output conditioning section 18.

Referring now to FIGS. 5A-5F, which cooperate to show one method for fabricating the waveguide structure 10 using an etching technique. As shown best in FIGS. 5A and 5B, the etching process begins with a starting structure that includes a waveguide 200. The buried waveguide 200 has a core material 202 with an index of $n_{co}$ that is at least partially buried or disposed with a cladding material 204 having an index contrast of $n_{cl}$.

Polarization rotation is facilitated by using material systems that have core-to-clad refractive index contrasts that are large (e.g., $n_{co}:n_{cl}>\sim 0.02$). In high index contrast waveguides, the change in geometrical shape of the waveguide, such as creating rectangles or "L" shaped waveguides in accordance with the present invention, introduces larger form-birefringence. Larger form-birefringence allows polarization rotation to occur over shorter lengths and with less polarization coupling (or degradation of the performance). In one embodiment, the core material 202 of the waveguide 200 is constructed of a material selected from a group consisting of silicon, silicon nitride, silicon oxynitride, silicon oxycarbide, germanium doped silica, Indium Phosphide, Gallium Arsenide, high index polymers, and combinations thereof; and the cladding material 204 is constructed of a material selected from a group consisting of silica, lower index silicon oxynitride, lower index silicon oxycarbide, Indium Galium Arsenide Phosphide, polymers, and combinations thereof.

Figures 5A, 5B:
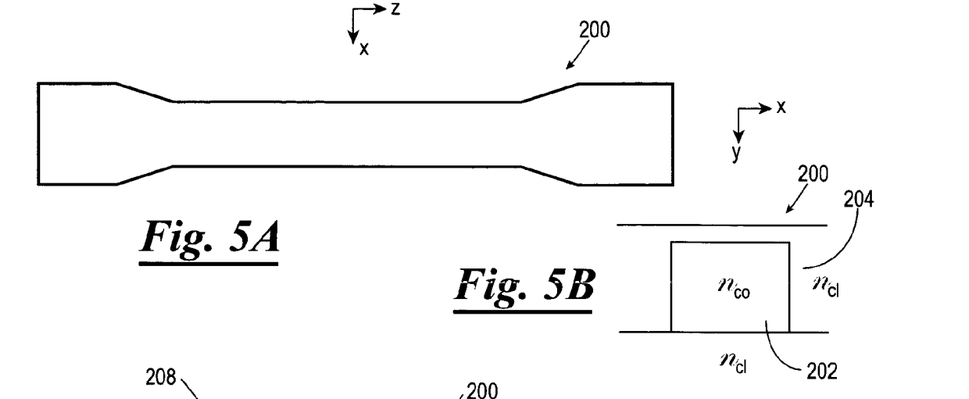
FIG. 5A is a top view of a starting structure.
FIG. 5B is a cross sectional view of the starting structure depicted in FIG. 5A.
Figures 5C, 5D:
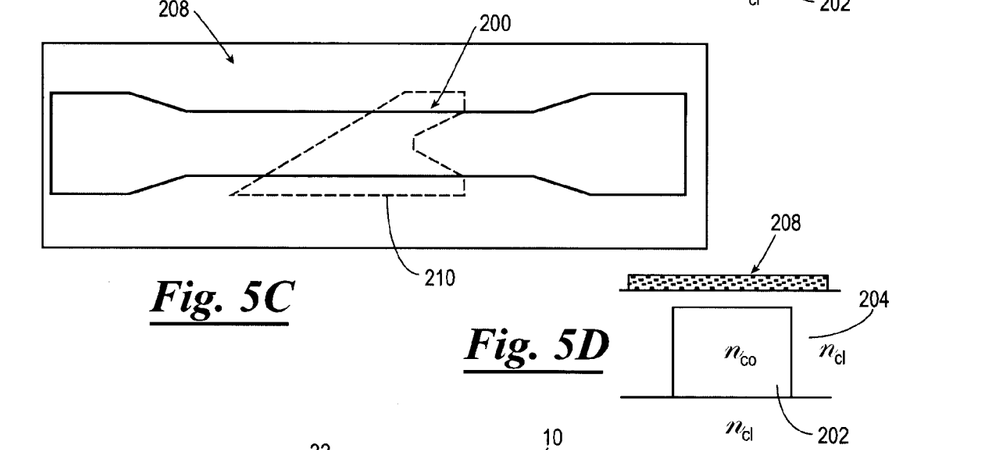
FIG. 5C is a top view of a photoresist layer on the starting structure depicted in FIG. 5A.
FIG. 5D is a cross sectional view of the photoresist layer and the starting structure depicted in FIG. 5C.

In a next step of the etching method, a photoresist layer 208 is disposed on the waveguide 200, as shown in FIGS. 5C and 5D. An opening 210 having a desired shape corresponding to the shape of the first level 42 of the polarization rotator 22 is patterned in the photoresist layer 208 over the waveguide 200, as shown best in FIG. 5C. Preferably, any additional patterns for the waveguide structure 10, such as for example the pattern for the output conditioning section 18 is also included in the shape of the opening 210 of the photoresist layer 208 so that the patterns can be formed together.

Figures 5E, 5F:
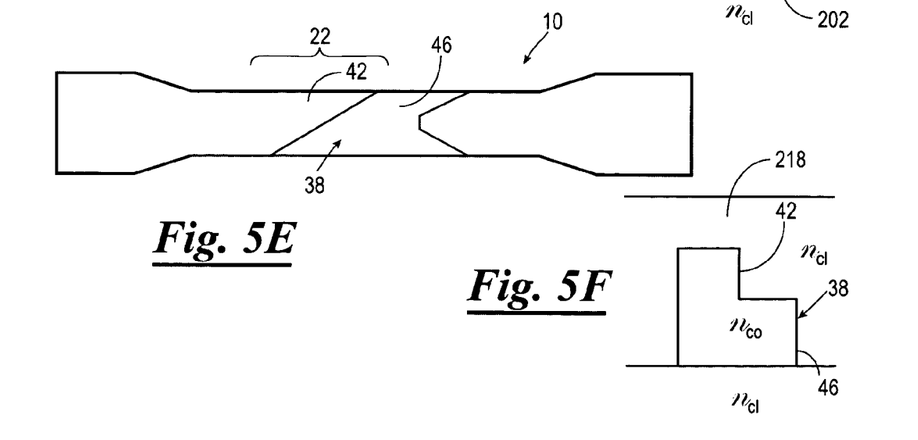
FIG. 5E is a top view of a waveguide structure after etching has been performed on the photoresist layer and starting structure depicted in FIG. 5C.
FIG. 5F is a cross sectional view of the waveguide structure depicted in FIG. 5E.

In general, the photoresist layer 208 is constructed of a material that prevents material beneath the photoresist layer 208 from being removed during the etching process. Thus, during etching, the exposed area resulting from the opening 210 in the photoresist layer 208 is removed to a proper depth, and the pattern of the opening 210 is transferred into the waveguide 200, as shown in FIGS. 5E and 5F. As such, the first level 42 and second level 46 of the polarization rotator 22, and the output conditioning section 18, are formed. After the etching process is complete, another layer of cladding material 218 is deposited over the entire structure and planarized if needed, as shown best in FIG. 5F.

It should be noted that the optimum polarization conversion is a result of both the initial etch pattern and also the etch depth. However, since the rotation mechanism of the polarization rotator 22 is adiabatic, it is expected that the performance characteristics of the polarization rotator 22 fabricated utilizing the etching method discussed above will have wide latitude in both fabrication and design.

Figure 6A:
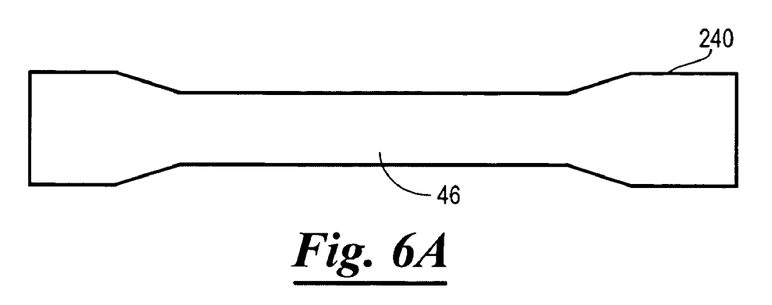
FIG. 6A is a top view of a first layer of a waveguide structure.
Figure 6B:
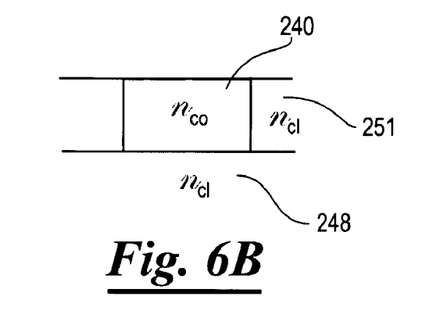
FIG. 6B is a cross sectional view of the first layer depicted in FIG. 6A
Figure 6C:
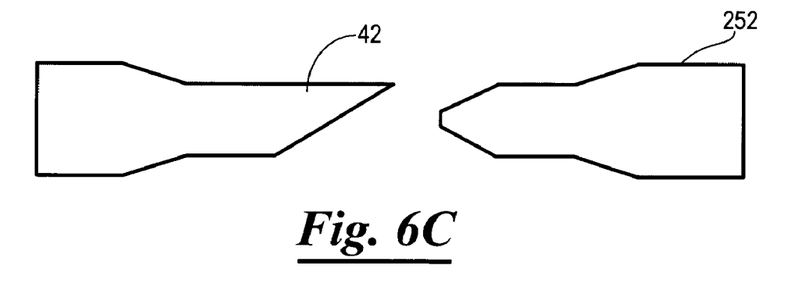
FIG. 6C is a top view of a second layer of the waveguide structure which is disposed onto the first layer depicted in FIG. 6A.
Figure 6D:
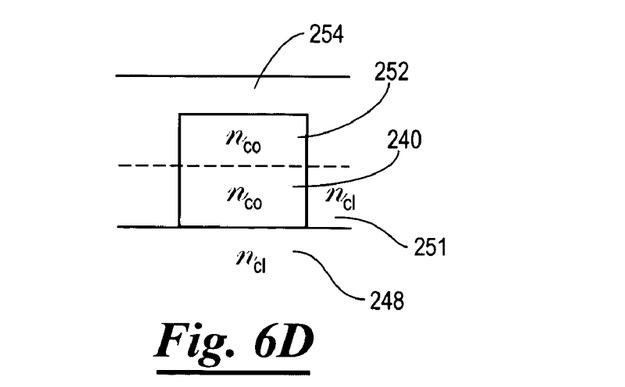
FIG. 6D is a cross sectional view of the second layer depicted in FIG. 6C disposed on the first layer depicted in FIG. 6A.

Referring now to FIGS. 6A-6D, shown therein is a method for fabricating the waveguide structure 10 using a layering technique. Preferably, this fabrication method uses two photomasks and two deposition steps, rather than a deposition and then an etch step as discussed above with reference to FIGS. 5A-5F. In the layering embodiment, the net waveguide structure 10 is realized by depositing at least two independent core layers having a refractive index $n_{co}$, one on top of the other. Preferably, a first reticle mask (not shown) is used to pattern a first layer of core material 240 on a layer of cladding material 248 to form a lower portion of the waveguide geometry of waveguide structure 10, as shown in FIGS. 6A and 6B. Preferably, the first layer of core material 240 is patterned such that the lower portion includes the second level 46 of the polarization rotator 22. Another layer of cladding material 251 having an index $n_{cl}$ is preferably deposited over the first layer of core material 240 and planarized right down to the top surface of the first layer of core material 240, ensuring that there is no remaining cladding material 248 over the top of the first layer of core material 240, as best shown in FIG. 6B. A second layer of core material 252, as shown in FIG. 6C, is then deposited onto the first layer of core material 240, as shown in FIG. 6D, using a second mask (not shown) to pattern the top portion of the waveguide geometry. Preferably, the second layer of core material 252 is patterned such that the top portion includes the first level 42 of the polarization rotator 22. Another layer of cladding material 254 can then be deposited over the entire surface and planarized if necessary, as shown in FIG. 6D.

The deposition process of the layering method discussed above can be performed using any appropriate process currently available or later developed. For example, layering can be performed by using the methods for chemical vapor deposition described in U.S. Pat. Nos. 6,614,977 and 6,771,868 and in the patent application identified by the U.S. Ser. No. 10/837,682, each of which is entitled "Use of Deuterated Gases for the Chemical Vapor Deposition of Thin Films for Low-Loss Optical Devices and Waveguides"; the entire contents of which are hereby expressly incorporated herein by reference.

An advantage of the layering fabrication method compared to the etching fabrication method discussed above is that the resulting structure can be more general. The etching method discussed above with reference to FIGS. 5A-5F generally allows for features to be etched in an existing waveguide. The layering method described above with reference in FIGS. 6A-6D allows for more arbitrary orientation of the two layers 240 and 252 of the waveguide structure 10.

While the above methods for fabricating the waveguide structure 10 of the present invention are described above in terms of fabricating one waveguide structure 10, it should be apparent to those skilled in the art that such fabrication methods, as well as any other appropriate fabrication techniques currently known in the art or later developed, can be utilized to fabricate one or more of the waveguide structure 10, or portions thereof, such as when one or more waveguide structures are included on a chip, or on a wafer (e.g., a silicon wafer) having a plurality of chips.

Further, to facilitate the design of the waveguide structure 10, in particular the polarization rotator 22, and to evaluate its geometry and properties, computer software code can be utilized to allow a user to construct a virtual representation of the waveguide structure 10. For example, such a tool can be implemented utilizing Optical Waveguide Mode Suite (OWMS) and Beam propagation solver software available from Apollo Photonics Corp. of Burlington, Ontario, Canada. This software also allows for numeric simulation using a full vector Beam Propagation Method (FV-BPM) (see also, W. P Huang and C. L. Xu, "Simulation of three-dimensional optical waveguides by a full-vector beam propagation method," IEEE J. Selected Topics in Quantum Electronics, vol. 29, pp. 2639-2649, 1993, the entire content of which is hereby incorporated herein by reference.) The FV-BPM takes into account all polarization effects including rotation of the optical field.

Figure 7:
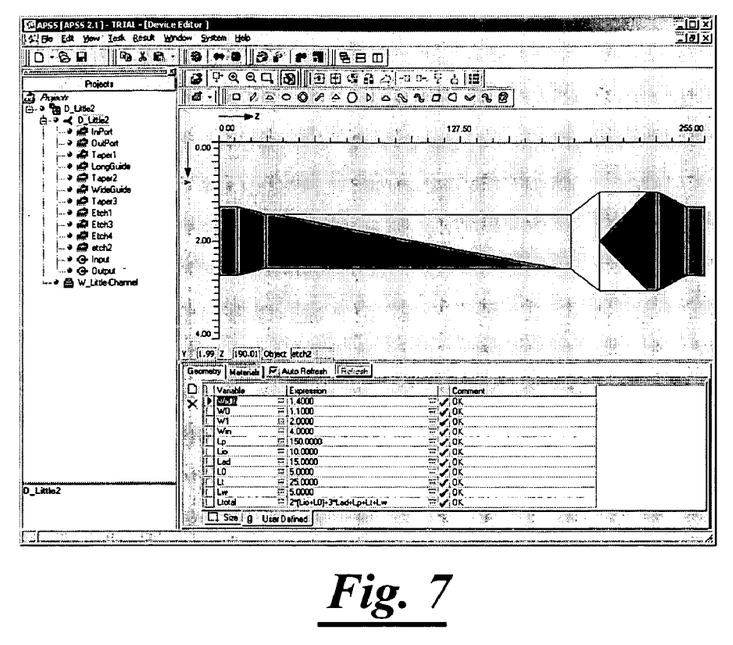
FIG. 7 shows an exemplary user interface for designing and evaluating a waveguide structure in accordance with the present invention.

For example, as shown in FIG. 7, software code can be used to provide a user interface to the user (e.g., via a monitor of a computer system) which receives input from the user (e.g., via a keyboard and/or mouse of the computer system). The user can input information into the user interface that defines one or more parameters associated with the waveguide structure 10. The software code can then utilize the inputted parameters to generate and display a virtual representation of a waveguide structure 10 corresponding to such parameters. Such parameters received from the user can include for example one or more of the following: the width $w_{in}$ of the input conditioning section 14, a length of the input conditioning section 14, a distance in which the input condition section 14 transitions from the width $w_{in}$ to the width $w_{IE}$ of the input end 30 of the polarization rotator 22, the width $w_{IE}$ and height $h_{IE}$ of the input end 30 of the polarization rotator 22, the length $l_{PR}$ of the midsection 38 of the polarization rotator 22, the taper length $l_T$ of the midsection 38, the distance $d_{IE}$ from the input end 30 where the decrease in the width $w_{L1}$ of the first level 42 of the midsection 38 begins, the distance $d_{OE}$ from the output end 34 where the width $w_{L1}$ of the first level 42 ends and/or equals zero, the slope (or some defining equation) for the boundary line 50 between the first level 42 and the second level 46 as a function of the taper length $l_T$ or portions thereof, the width $w_{OE}$ and height $h_{OE}$ of the output end 34 of the polarization rotator 22, the width $w_{out}$ and height $h_{out}$ of the output conditioning section 18, a length of the output condition section 18, a distance in which the output condition section 18 transitions from the width $w_{OE}$ to the width $w_{out}$ and from the height $h_{OE}$ to the height $h_{out}$, or any other geometric feature or property of the waveguide structure 10.

Figure 8:
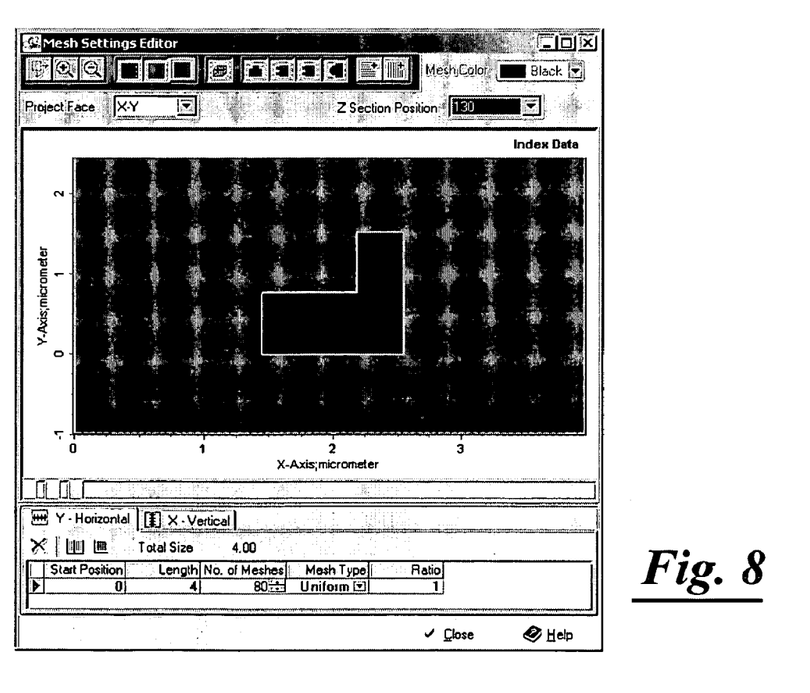
FIG. 8 shows an exemplary cross section displayed in the user interface.

As discussed above, in one embodiment, the virtual representation can be used to simulate the geometries and properties associated with the resulting waveguide structure. For example, as shown in FIG. 8, cross-section views can be observed at different points along the length of the waveguide structure 10.

Further, such a virtual representation can be incorporated into a design application (such as OWMS) which allows the virtual representation to be positioned within a design in combination with other elements, such as in the design of chips and/or wafers having a plurality of chips. Such capability allows a waveguide structure 10 designed by the user (or having predetermined parameters) to be evaluated in combination with other elements in a optical circuit.

The following examples of the construction, functionality and use of the waveguide structure of the present invention is set forth hereinafter. It is to be understood that the examples are for illustrative purposes only and is not to be construed as limiting the scope of the invention as described and claimed herein.

EXAMPLE 1

Design/Performance

Figure 9:
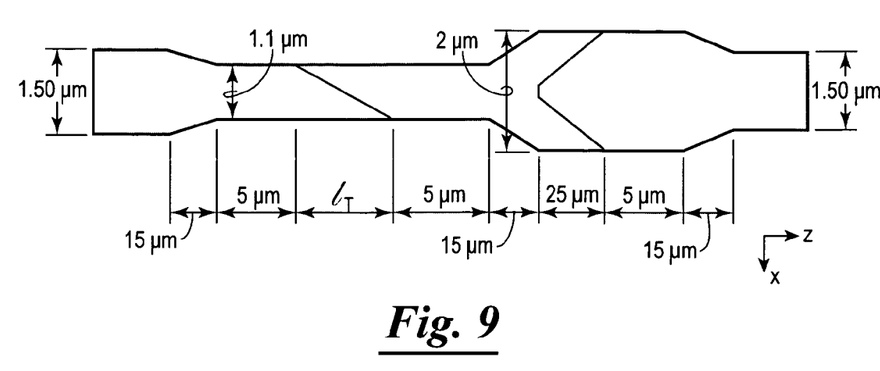
FIG. 9 shows an exemplary waveguide structure with an exemplary polarization rotator constructed in accordance with the present invention.

The polarization rotator 22 with a geometry as shown in FIG. 9 was numerically simulated using a full vector Beam Propagation Method (FV-BPM). The nominal waveguide thickness for the simulation was about 1.5 μm, and the polarization inducing etch depth was about 750 nm. The waveguide core index was about 1.70, while the cladding surrounding the waveguide index was about 1.45. The taper length $l_T$ was a design parameter that was varied.

Figure 10A:
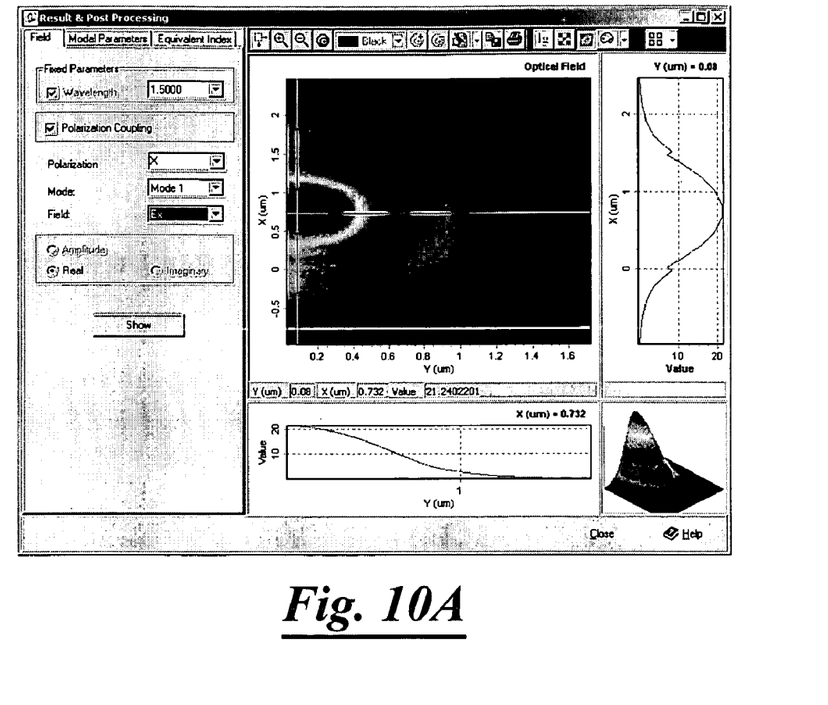
FIG. 10A shows a computer simulation of the $E_x$ component of the TE polarized mode at an input end of the exemplary polarization rotator depicted in FIG. 9.
Figure 10B:
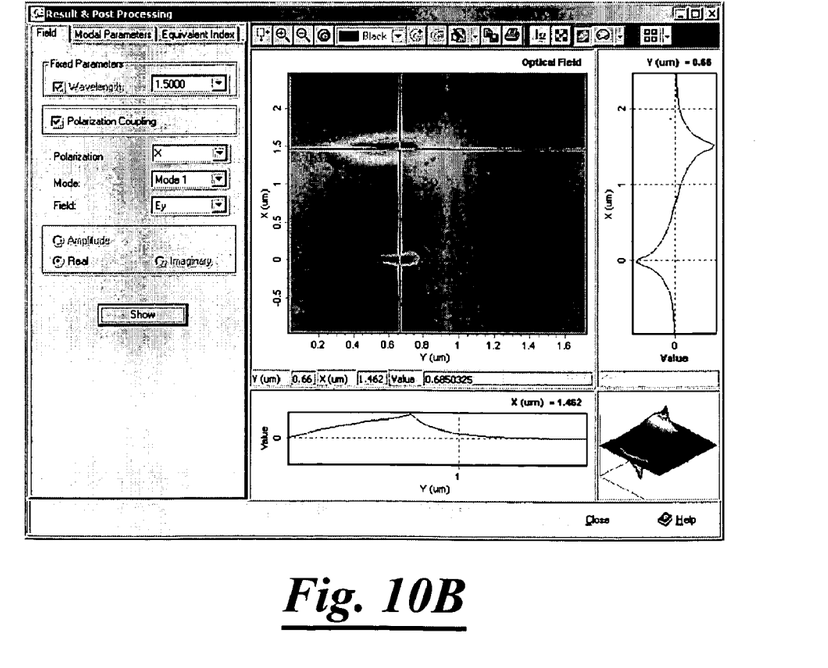
FIG. 10B shows a computer simulation of the $E_y$ component of the TE polarized mode at an input end of the exemplary polarization rotator depicted in FIG. 9.
Figure 10C:
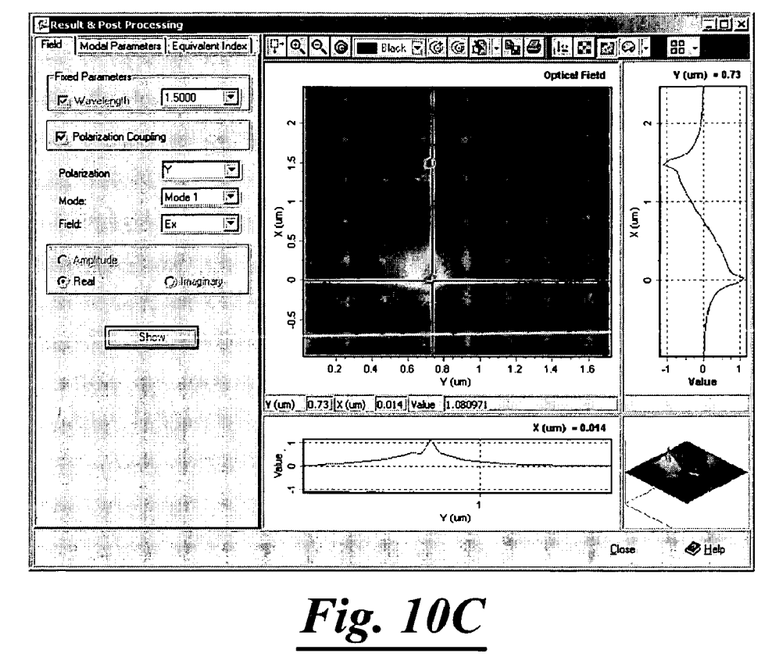
FIG. 10C shows a computer simulation of the $E_x$ component of the TM polarization mode at an input end of the exemplary polarization rotator depicted in FIG. 9.
Figure 10D:
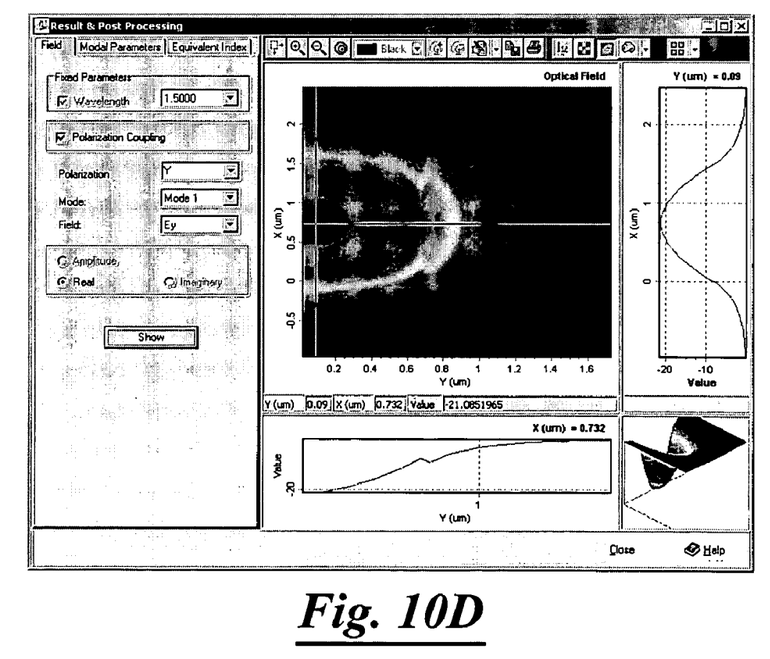
FIG. 10D shows a computer simulation of the $E_y$ component of the TM polarization mode at an input end of the exemplary polarization rotator depicted in FIG. 9.
Figure 11A:
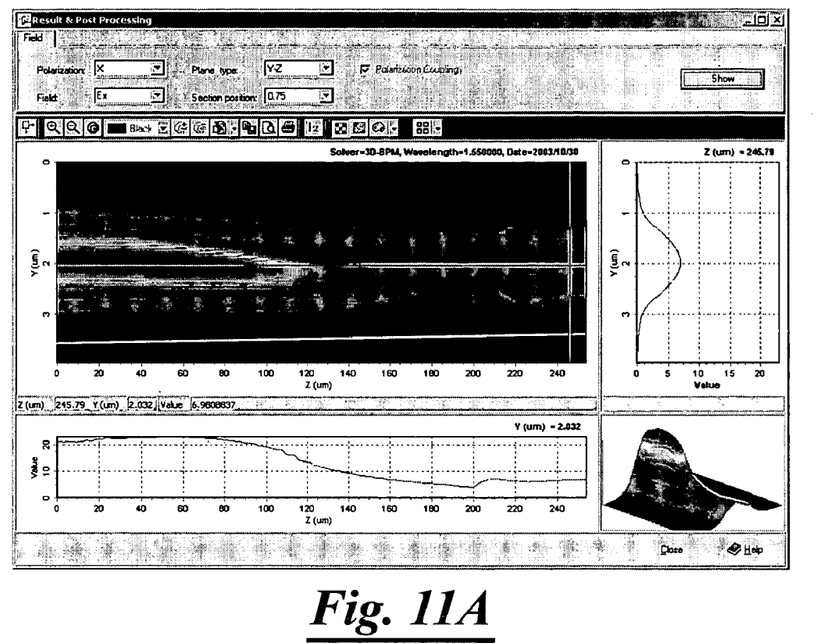
FIG. 11A shows a computer simulation of the optical field evolution of the TE polarization mode for the exemplary polarization rotator depicted in FIG. 9.
Figure 11B:
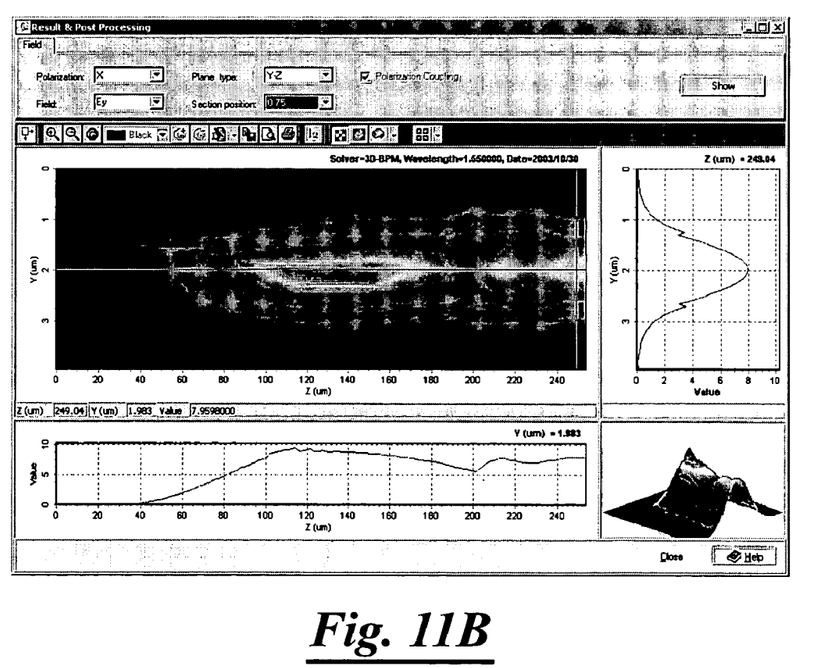
FIG. 11B shows a computer simulation of the optical field evolution of the TM polarization mode for the exemplary polarization rotator depicted in FIG. 9.

Shown in FIGS. 10A and 10B are computational models for the X-polarized (TE) mode at the input end 30 of the polarization rotator 22, and shown in FIGS. 10C and 10D are the computational models for the Y-polarized (TM) modes at the input end 30 of the polarization rotator 22 (where the waveguide structure 10 is 1.1 μm wide and 1.5 μm thick). Shown in FIG. 11A is the optical field evolution for the X-polarized (TE) mode for the structure of FIG. 9 for a taper length of $l_T$=500 μm, and shown in FIG. 11B is the optical field evolution for the Y-polarized (TM) mode for the structure of FIG. 9 for a taper length of $l_T$=500 μm. The plots represent a cross section through the middle of the device in the Y-Z plane. It can be seen that an X-polarized mode launched at the input end gets converted to a Y-polarized mode as a function of propagation distance. This is shown by the fact that the power in the X-polarized mode decreases while that of the Y-polarized mode increases as a function of propagation distance.

As a function of taper length $L_T$, the amount of rotation found in the computer simulation is provided in the following table:

| $L_T(\mu m)$ | Rotation Ratio Rotation (degrees) |
|---|---|
| 150 | 40 |
| 200 | 83.5 |
| 500 | 86.4 |
| 1000 | 88.9 |
| 2000 | 89.9 |

EXAMPLE 2

Application

As discussed herein, the waveguide structure 10 of the present invention can be used in an integrated optical circuit having other waveguide elements. As one example application, the waveguide structure 10 can be integrated with a polarization beam splitter, such as the polarization beam splitter described in a co-pending patent application entitled "Integrated Optical Polarization Beam Splitter", which is identified by U.S. Ser. No. 10/661,891; the entire content of which is hereby expressly incorporated herein by reference.

For example, the polarization beam splitter can be utilized to split the polarization of an incident optical beam or signal into two orthogonal optical signals, a TE mode signal and a TM mode signal. One of the TE mode signal or the TM mode signal can then be transmitted through the polarization rotator 22 of the present invention so that its polarization is rotated to match the polarization of the other signal, thereby providing a single common polarization orientation between the two signals. This allows for the two signals to then be combined, such as for example with a coupler (or other signal combining device).

From the above description, it is clear that the present invention is well adapted to carry out the objects and to attain the advantages mentioned herein, as well as those inherent in the invention. For example, it can be seen that the waveguide structure 10 of the present invention can be utilized in the fabrication of integrated optics and optical circuits, where it is often desirable to rotate the polarization by ninety degree or equivalently, to convert a TE polarized signal into a TM polarized signal, and/or a TM polarized signal into a TE polarized signal. Further, the present invention uses a certain type of structure and geometry that can be fabricated using conventional semiconductor fabrication steps, including CMOS fabrication techniques. The present invention is also a readily integrated optics component, unlike other types of polarization rotators (such as for example a high birefringent plate, which must be mechanically placed in a slot cut into a waveguide circuit). Further, the present invention does not require specialized materials such magneto optic, gyrotropic, electrooptic, anisotropic, or birefringent materials, and it does not require any externally applied fields or post-fabrication calibration. Also, the performance of the present invention is insensitive to exact geometry and device length, and is wavelength independent.

Although the foregoing invention has been described in some detail by way of illustration and example for purposes of clarity of understanding, it will be apparent to those skilled in the art that certain changes and modifications may be practiced without departing from the spirit and scope of the present invention, as described herein. As such, those skilled in the art will appreciate that the conception upon which this disclosure is based may readily be utilized as a basis for the designing of other structures, methods, and systems for carrying out the several purposes of the present invention. As such, it should be understood that the invention is not limited to the specific and preferred embodiments described herein, including the details of construction and the arrangements of the components as set forth in the above description or illustrated in the drawings. Further, it should be understood that the phraseology and terminology employed herein are for the purpose of description and should not be regarded as limiting.

What is claimed is:

1. A waveguide structure comprising:
a polarization rotator comprising an input end, an output end and a midsection extending between the input end and the output end, the midsection including a core having a single layer and including a first level and a second level disposed adjacent the first level, the first level having a width that decreases along at least a portion of a length of the first level, such that the core induces rotation of a polarization of an electromagnetic signal as the electromagnetic signal propagates along the length of the midsection.

2. The waveguide structure of claim 1, further comprising an input conditioning section disposed adjacent the input end of the polarization rotator.

3. The waveguide structure of claim 1, further comprising an output conditioning section disposed adjacent the output end of the polarization rotator.

4. The waveguide structure of claim 1, wherein an amount of the rotation is about ninety degrees.

5. The waveguide structure of claim 1, wherein the width of the first level decreases along the length of the first level with a substantially constant slope such that the first level is substantially wedge shaped.

6. The waveguide structure of claim 1, wherein the width of the first level decreases at different rates along at least a portion of the length of the first level.

7. The waveguide structure of claim 1, wherein the input end has a cross sectional geometry where a TM mode of the electromagnetic signal has a larger effective mode index than a TE mode of the electromagnetic signal, and wherein the output end has a cross section such that the TE mode has a larger effective mode index than the TM mode.

8. The waveguide structure of claim 1, wherein the input end has a vertically oriented rectangularly shaped cross section in a direction transverse to a direction of propagation of the electromagnetic signal in the input end.

9. The waveguide structure of claim 1, wherein the output end has a horizontally oriented rectangularly shaped cross section in a direction transverse to a direction of propagation of the electromagnetic signal in the output end.

10. The waveguide structure of claim 1, wherein the polarization rotator includes a material selected from a group consisting of silicon, silicon nitride, silicon oxynitride, silicon oxycarbide, germanium doped silica, Indium Phosphide, Gallium Arsenide, high index polymers, and combinations thereof.

11. A waveguide structure comprising:
a polarization rotator comprising an input end, an output end and a midsection extending between the input end and the output end, the midsection including a core having a uniform construction and including a first level and a second level disposed adjacent the first level, the first level having a width that decreases along at least a portion of a length of the first level, such that the core induces rotation of a polarization of an electromagnetic signal as the electromagnetic signal propagates along the length of the midsection.

12. The waveguide structure of claim 11, wherein an amount of the rotation is about ninety degrees.

13. The waveguide structure of claim 11, wherein the width of the first level decreases along the length at a substantially constant rate, such that the first level is substantially wedge shaped along the length of the first level.

14. The waveguide structure of claim 11, wherein the width of the first level decreases at different rates along at least a portion of the length of the first level.

15. The waveguide structure of claim 11, wherein the input end has a cross sectional geometry where a TM mode of the electromagnetic signal has a larger effective mode index than a TE mode of the electromagnetic signal, and wherein the output end has a cross section, such that the TE mode has a larger effective mode index than the TM mode.

16. The waveguide structure of claim 11, wherein the polarization rotator includes a material selected from a group consisting of silicon, silicon nitride, silicon oxynitride, silicon oxycarbide, germanium doped silica, Indium Phosphide, Gallium Arsenide, high index polymers, and combinations thereof.

* * * * *